United States Patent
Lai et al.

(10) Patent No.: US 7,655,079 B2
(45) Date of Patent: Feb. 2, 2010

(54) GAS-LIQUID SEPARATION APPARATUS

(75) Inventors: Cheng-Tien Lai, Tu-Cheng (TW); Zhi-Yong Zhou, Shenzhen (CN); Qiao-Li Ding, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, Taipei Hsien (TW)

( * ) Notice: Subject to any disclaimer, the term of this patent is extended or adjusted under 35 U.S.C. 154(b) by 524 days.

(21) Appl. No.: 11/309,903

(22) Filed: Oct. 26, 2006

(65) Prior Publication Data

US 2008/0098897 A1 May 1, 2008

(51) Int. Cl.
*B01D 19/00* (2006.01)
(52) U.S. Cl. .......................................... 96/216; 95/261
(58) Field of Classification Search .............. 96/208, 96/216, 155, 204; 95/261, 260; 55/456; 137/171, 808
See application file for complete search history.

(56) References Cited

U.S. PATENT DOCUMENTS

| | | | | |
|---|---|---|---|---|
| 1,535,754 A | * | 4/1925 | Williams | 95/172 |
| 3,157,478 A | * | 11/1964 | Edwards | 95/261 |
| 4,272,258 A | * | 6/1981 | Shifflett | 95/260 |
| 6,402,799 B1 | | 6/2002 | Kokubo et al. | |
| 6,893,485 B2 | * | 5/2005 | MacDuff | 95/241 |
| 7,364,609 B2 | * | 4/2008 | MacDuff | 96/165 |
| 2003/0221560 A1 | * | 12/2003 | MacDuff | 96/165 |
| 2005/0132889 A1 | * | 6/2005 | MacDuff | 96/165 |

* cited by examiner

*Primary Examiner*—Duane Smith
*Assistant Examiner*—Douglas J Theisen
(74) *Attorney, Agent, or Firm*—Frank R. Niranjan

(57) ABSTRACT

A gas-liquid separation apparatus includes an inlet pipe for transferring liquid with gas dissolved therein and a separating pipe for separating the gas from the liquid. The separating pipe has a spiral-shaped guiding member therein. The separating pipe extends from the inlet pipe and is in alignment and communicating with the inlet pipe. An outlet pipe extends from a joint of the inlet pipe and the separating pipe and communicates with the separating pipe, for transferring therein the liquid after the liquid has been degassed by the spiral-shaped guiding member in the separating pipe. A gas storage device communicates with the separating pipe and outside for collecting the gas from the separating pipe and discharging the gas to the outside.

15 Claims, 2 Drawing Sheets

GAS-LIQUID SEPARATION APPARATUS

FIELD OF THE INVENTION

The present invention relates generally to a gas-liquid separation apparatus, and more particularly to a gas-liquid separation apparatus for separating gas from liquid in a transferring pipe or vessel.

DESCRIPTION OF RELATED ART

Nowadays, many systems involve liquid transfer via pipes for example, cooling liquid is transferred by pipes systems to cool heat generating devices. Generally, the liquid has some gas dissolved therein, which may adversely impact normal work or transfer capacity of the pipe systems.

In order to ensure normal operation of a liquid pipes system, it is desirable to separate the gas from the liquid. However, pipes systems are usually hermetically sealed, and the gas in the vessels can not escape from the liquid. Therefore a gas-liquid apparatus may be used to separate the gas from the liquid. A related gas-liquid apparatus generally comprises a large reservoir, a filtrating or rotating impeller located in the reservoir, and other members connecting with the reservoir. However, the related gas-liquid apparatus has large bulk, large flowing resistance, complicated configuration and so on.

Therefore, what is need, therefore, is a gas-liquid separation apparatus with simple configuration.

SUMMARY OF THE INVENTION

A gas-liquid separation apparatus in accordance with a preferred embodiment of the present invention comprises an inlet pipe for transferring liquid with gas dissolved therein and a separating pipe for separating the gas from the liquid. The separating pipe has a spiral-shaped guiding member therein. When the liquid flows to the guiding member, the gas in the liquid is separated therefrom. The separating pipe extends from the inlet pipe and is in alignment and communication with the inlet pipe. An outlet pipe extends laterally from a joint of the inlet pipe and the separating pipe and communicates with the separating pipe, for transferring the degassed liquid therein. A gas storage device communicates with the separating pipe and ambient for collecting the gas from the separating pipe and discharging the gas to the outside.

Other advantages and novel features of the present invention will become more apparent from the following detailed description of preferred embodiment when taken in conjunction with the accompanying drawings, in which:

BRIEF DESCRIPTION OF THE DRAWINGS

Many aspects of the present device can be better understood with reference to the following drawings. The components in the drawings are not necessarily drawn to scale, the emphasis instead being placed upon clearly illustrating the principles of the present device. Moreover, in the drawings, like reference numerals designate corresponding parts throughout the several views.

DETAILED DESCRIPTION OF THE INVENTION

Figure 1:
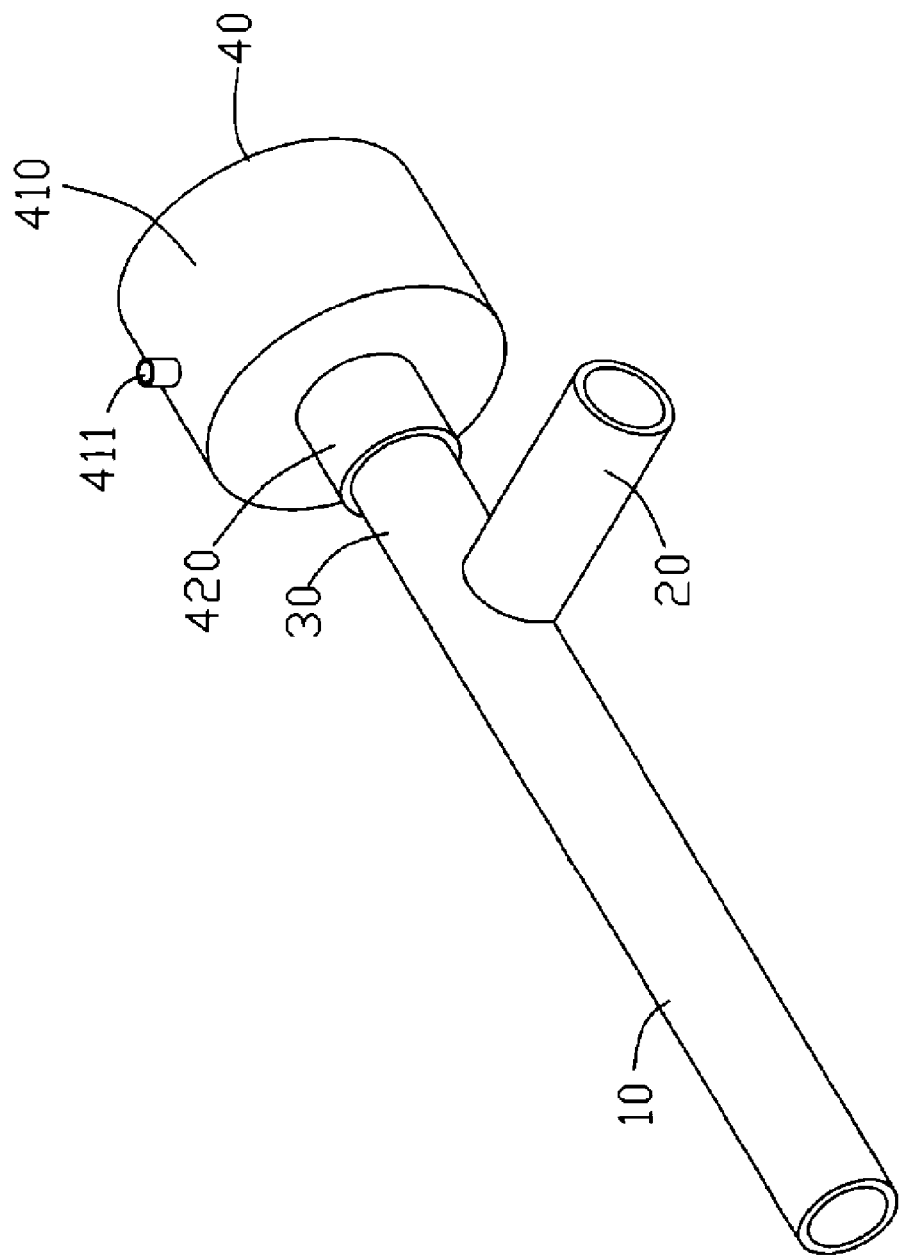
FIG. 1 is an isometric view of a gas-liquid separation apparatus in accordance with a preferred embodiment of the present invention.
Figure 2:
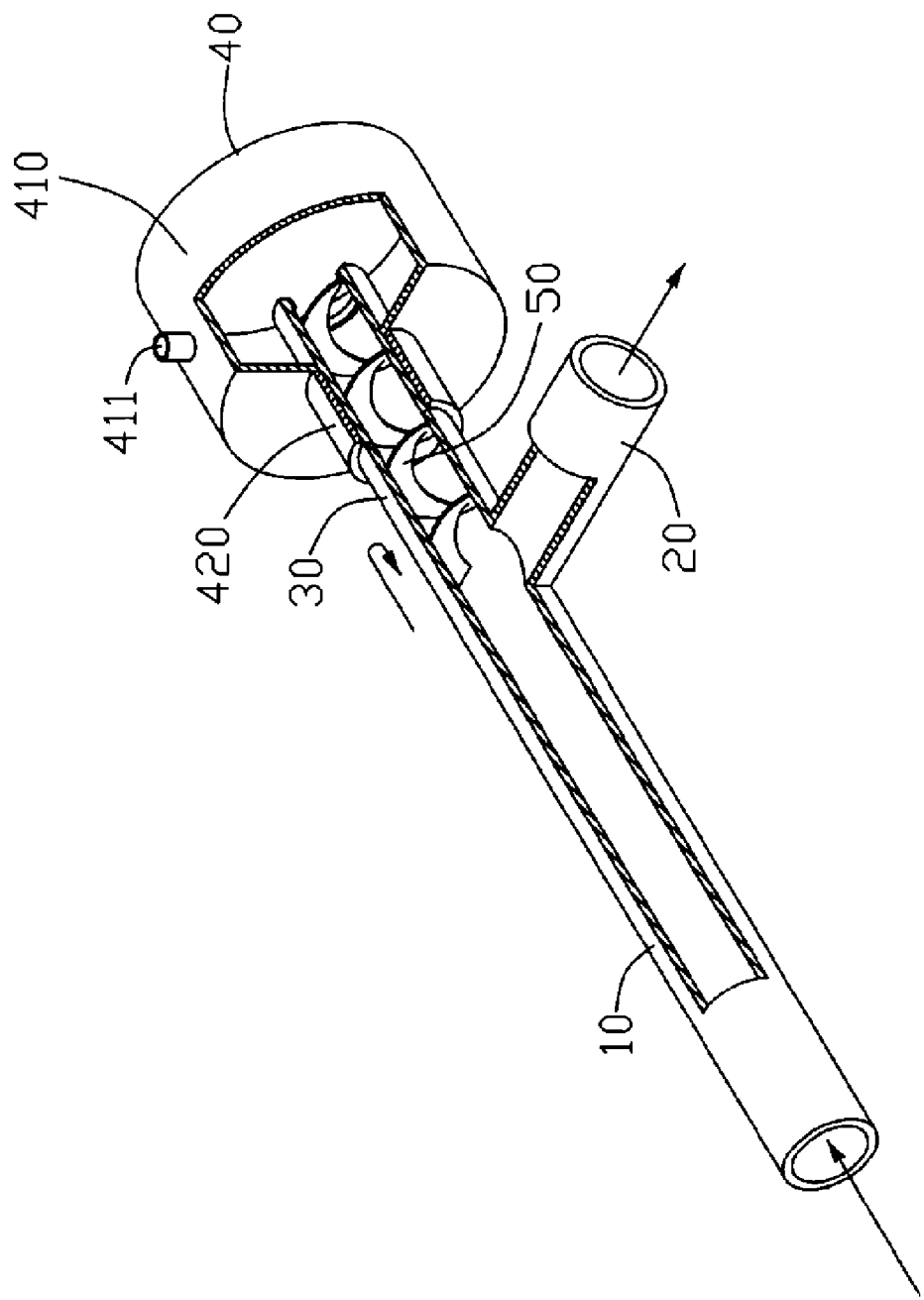
FIG. 2 is a partially-cutaway view of the gas-liquid separation apparatus of FIG. 1.

Referring to FIGS. 1 and 2, a gas-liquid separation apparatus in accordance with a preferred embodiment of the present invention comprises an inlet pipe 10, an outlet pipe 20 communicating with the inlet pipe 10, a separating pipe 30 communicating with the inlet pipe 10 and the outlet pipe 20, and a gas storage device 40 for storing gas separated from liquid in the inlet pipe 10.

The outlet pipe 20 substantially perpendicularly extends from the inlet pipe 10. The separating pipe 30 extends from a joint of the inlet pipe 10 and the outlet pipe 20 and is in alignment with the inlet pipe 10. The gas storage device 40 comprises a cylindrical container 410 and a sleeve 420 extending from a bottom of the container 410. The sleeve 420 hermetically engages with the separating pipe 30. The separating pipe 30 extends into the container 410. A drain tap 411 extends from a circumferential face of the container 410; from the drain tap 411, the gas in the collected in the container 410 can be discharged to outside when a pressure in the container 410 reaches a certain value.

As illustrated in FIG. 2, the separating pipe 30 has a spiral guiding member 50 disposed therein. The guiding member 50 has a first end located at the joint of the separating pipe 30 and the outlet pipe 20 and a second end located at a distal end of the separating pipe 30 in the container 410. In this case, the guiding member 50 is made from metal plate. The guiding member 50 is fixed in the separating pipe 30 by welding or by interferential means.

In use, the gas-liquid separation apparatus is disposed with the gas storage device 40 located above the inlet pipe 10. The liquid with high flow rate flows toward the gas storage device 40 in the inlet pipe 10. When the liquid reaches the joint of the inlet pipe 10 and the outlet pipe 20, the liquid rushes into the separating pipe 30 under inertia thereof. In the separating pipe 30, the liquid suffers resistance from the guiding member 50 and pressure of the gas storage device 40, and the flow rate falls rapidly. Furthermore, the liquid makes centrifugal motion when the liquid encounters the guiding member 50; centrifugal force produced by the motion urges small gas bubbles in the separating pipe 30 to pool into big bubbles with high pressure therein. Because the pressure in the big bubbles is larger than that in the container, the big bubbles are discharged into the container 410 of the gas storage device 40 from the separating pipe 30. Therefore, the gas is separated out of the liquid. At the joint of the inlet pipe 10 and the separating pipe 30, the liquid without gas goes into the outlet pipe 20.

According to the aforesaid preferred embodiment, the separating pipe 30 extends from the inlet pipe 10, the gas and the liquid are separated in the separating pipe 30, and the gas storage device 40 collects and discharges the gas from the separating pipe 30. Therefore, the gas comes from the inlet pipe 10 is separated from the liquid. Furthermore, the separating pipe 30 has the guiding member 50 located therein, which produces centrifugal force to urge the gas to separate from the liquid and be discharged into the gas storage device 40 to be vented to ambient. In comparison with the related gas-liquid separation apparatus, the gas-liquid separation apparatus of the present invention has a simple configuration and a small volume.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A gas-liquid separation apparatus comprising:
   an inlet pipe for transferring liquid with gas dissolved therein;
   a separating pipe for separating the gas from the liquid, the separating pipe extending from the inlet pipe, the separating pipe being in alignment and communicating with the inlet pipe;
   an outlet pipe for transferring the liquid without gas therein, the outlet pipe extending from a joint of the inlet pipe and the separating pipe and communicating with the separating pipe; and
   a gas storage device communicating with the separating pipe for collecting gas coming from the separating pipe;
   wherein the separating pipe has a guiding member located therein for impelling the gas to separate from the liquid; and
   wherein the guiding member extends spirally along a length of the separating pipe for producing centrifugal motion to the liquid in the separating pipe.

2. The gas-liquid separation apparatus of claim 1, wherein the guiding member extends from the joint of the inlet pipe and the separating pipe to a distal end of the separating pipe.

3. The gas-liquid separation apparatus of claim 1, wherein the gas storage device comprises a container and a sleeve extending from the container, the sleeve engaging with the separating pipe.

4. The gas-liquid separation apparatus of claim 3, wherein the separating pipe has a distal end thereof extending into the container of the gas storage device.

5. The gas-liquid separation apparatus of claim 3, wherein the container of the gas storage device extends a drain tap at a circumferential face thereof for discharging the gas in the container.

6. A gas-liquid separation apparatus comprising:
   an inlet pipe for transferring liquid with gas dissolved therein;
   a separating pipe in communication with the inlet pipe for separating the liquid from the gas therein;
   an outlet pipe for transferring the liquid which is from the separating pipe and separated from the gas, the outlet pipe extending from a joint between the inlet pipe and the separating pipe; and
   a gas storage device communicating with the separating pipe and outside for collecting the gas from the separating pipe and discharging the gas to the outside;
   wherein the separating pipe has a guiding member located therein for producing centrifugal motion to the liquid in the separating pipe; and
   wherein the guiding member extends spirally along a length of the separating pipe.

7. The gas-liquid separation apparatus of claim 6, wherein the separating pipe is in alignment with the inlet pipe.

8. The gas-liquid separation apparatus of claim 6, wherein the guiding member extends from the joint of the separating pipe and the outlet pipe to the gas storage device.

9. The gas-liquid separation apparatus of claim 6, wherein the gas storage device comprises a sleeve engaging with the separating pipe and a container accommodating a distal end of the separating pipe therein, the sleeve extending from an end of the container.

10. The gas-liquid separation apparatus of claim 9, wherein the container of the gas storage device has a drain tap extending from a circumferential face thereof for discharging gas in the container.

11. The gas-liquid separation apparatus of claim 10, wherein the container of the gas storage device is cylindrical.

12. A gas-liquid separation apparatus comprising:
    an inlet pipe;
    a separating pipe located above the inlet pipe;
    an outlet pipe extending laterally from a joint between the inlet pipe and the separating pipe; and
    a spiral-shaped guiding member located in the separating pipe;
    wherein the guiding member extends spirally along a length of the separating pipe for producing centrifugal motion to the liquid in the separating pipe; and
    wherein when liquid with air dissolved therein flows upwardly from the inlet pipe toward the separating pipe, the air in the liquid is separated from the liquid by the guiding member, the liquid which has been degassed flowing from the separating pipe to the outlet pipe.

13. The gas-liquid separation apparatus of claim 12 further comprising a cylindrical container mounted on a top of the separating pipe.

14. The gas-liquid separation apparatus of claim 13, wherein the cylindrical container has a gas drain tap thereon.

15. The gas-liquid separation apparatus of claim 14, wherein the gas drain tap is formed on a circumferential face of the cylindrical container.

* * * * *

UNITED STATES PATENT AND TRADEMARK OFFICE
CERTIFICATE OF CORRECTION

PATENT NO. : 7,655,079 B2  
APPLICATION NO. : 11/309903  
DATED : February 2, 2010  
INVENTOR(S) : Lai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 623 days.

Signed and Sealed this

Twenty-third Day of November, 2010

David J. Kappos  
*Director of the United States Patent and Trademark Office*